United States Patent
Cui et al.

(10) Patent No.: US 7,025,701 B2
(45) Date of Patent: Apr. 11, 2006

(54) OIL PROPELLER WHEEL AND SHAFT FOR POWER TRANSMISSION DEVICES

(75) Inventors: Yugang Cui, Troy, MI (US); Theodore M. Joslin, Dexter, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 94 days.

(21) Appl. No.: 10/813,578

(22) Filed: Mar. 30, 2004

(65) Prior Publication Data

US 2005/0221940 A1  Oct. 6, 2005

(51) Int. Cl.
*F16H 57/04* (2006.01)

(52) U.S. Cl. .................. 475/159; 475/160

(58) Field of Classification Search ........... 475/159, 475/160; 74/467; 184/11.2
See application file for complete search history.

(56) References Cited

U.S. PATENT DOCUMENTS

| | | | | |
|---|---|---|---|---|
| 2,997,897 A | * | 8/1961 | Brownyer | 475/160 |
| 3,015,970 A | * | 1/1962 | Mueller | 475/160 |
| 3,848,691 A | * | 11/1974 | Dolan | 475/160 |
| 4,090,748 A | | 5/1978 | Sugimoto et al. | 308/121 |
| 4,183,263 A | * | 1/1980 | Osenbaugh | 475/160 |
| 4,209,086 A | | 6/1980 | Friedrich | 192/53 F |
| 4,287,783 A | | 9/1981 | Ida et al. | 74/467 |
| 4,359,142 A | | 11/1982 | Schultz et al. | 184/11.1 |
| 4,442,729 A | | 4/1984 | Hayakawa | 74/467 |
| 4,656,885 A | | 4/1987 | Hori et al. | 74/467 |
| 4,677,871 A | | 7/1987 | Taniyama et al. | 74/467 |
| 4,699,249 A | | 10/1987 | Fujura et al. | 184/11.1 |
| 4,777,838 A | | 10/1988 | Aarestad | 74/468 |
| 4,841,797 A | | 6/1989 | Cerrington et al. | 74/467 |
| 4,905,535 A | | 3/1990 | Ludwig et al. | 74/468 |
| 5,064,025 A | | 11/1991 | Richards | 184/6.12 |
| 5,092,196 A | | 3/1992 | Kameda et al. | 74/606 R |
| 5,176,040 A | | 1/1993 | Kawabe | 74/467 |
| 5,341,901 A | | 8/1994 | Mueller et al. | 184/6.12 |
| 5,493,930 A | | 2/1996 | Schnizler | 74/468 |
| 5,634,530 A | | 6/1997 | Maekawa et al. | 184/6.12 |
| 5,651,425 A | | 7/1997 | Hill et al. | 184/6.12 |
| 5,740,697 A | | 4/1998 | Yamase | 74/467 |
| 5,810,116 A | | 9/1998 | Kaptrosky | 184/11.1 |
| 6,063,001 A | * | 5/2000 | Suhling et al. | 475/159 |
| 6,132,329 A | * | 10/2000 | Tison | 475/160 |

FOREIGN PATENT DOCUMENTS

JP  6-341516  * 12/1994

* cited by examiner

*Primary Examiner*—Sherry Estremsky
(74) *Attorney, Agent, or Firm*—Harness, Dickey & Pierce P.L.C.

(57) ABSTRACT

A power transfer device includes a casing, a lubricant reservoir in the casing having lubricant therein, and a shaft rotatably supported in the casing. The shaft extends into the lubricant reservoir. A lubricant driving structure is coupled to the shaft for common rotation. The lubricant driving structure includes at least one helically shaped member that extends longitudinally along and circumferentially about the shaft. The at least one helically shaped member is located in the lubricant reservoir. Rotation of the at least one helically shaped member drives the lubricant axially along the shaft and away from the lubricant reservoir. According to other features, an oil propeller wheel is mounted around a shaft in the power transfer device for rotation therewith. The oil propeller wheel communicates with the lubrication in the lubricant reservoir and is operable to direct the lubricant from the lubricant reservoir axially along the shaft toward the differential assembly.

15 Claims, 5 Drawing Sheets

OIL PROPELLER WHEEL AND SHAFT FOR POWER TRANSMISSION DEVICES

FIELD OF THE INVENTION

The present invention relates to power transmission devices for use in automotive vehicles and more particularly to lubrication mechanisms for delivering lubrication to predetermined locations within a power transmission device.

BACKGROUND OF THE INVENTION

Effective oil lubrication is important for many mechanical systems. Lubrication may be employed in a given mechanical system to reduce the operating temperature, reduce noise level, reduce contact resistance of inter-working components, and increase overall longevity of the mechanical system.

Many conventional mechanical systems, such as transmissions and transfer cases, incorporate an oil pump to facilitate lubrication to desired components. Alternatively, some mechanical systems may incorporate splash lubrication whereby oil is splashed onto a desired bearing or component by a gear or simple rotating disk incorporated in the mechanical system proximate the desired component.

While such arrangements are satisfactory for their intended purpose, a need exists to develop simpler, more cost-effective alternatives that provide the desired function while advancing the art.

SUMMARY OF THE INVENTION

A power transfer device includes a casing, a lubricant reservoir in the casing and a shaft rotatably supported in the casing. The shaft extends into the lubricant reservoir, the lubricant reservoir having lubricant therein. A lubricant driving structure is coupled to the shaft for common rotation therewith. The lubricant driving structure includes at least one helically shaped member that extends longitudinally along and circumferentially about at least a portion of the shaft. The at least one helically shaped member is at least partially located in the lubricant reservoir. Rotation of the at least one helically shaped member drives a portion of the lubricant in an axial direction along the shaft and away from the lubricant reservoir.

According to other features, the at least one helically-shaped member comprises a plurality of circumferentially-spaced apart teeth that extend outwardly of the shaft. The teeth taper radially outwardly along a direction that is generally opposite an axial direction in which the portion of the lubricant is driven. The at least one helically shaped member is integrally formed with the shaft. The shaft extends into a hole formed into another component of the power transfer device and the at least one helically shaped member terminates axially along the shaft prior to a point at which the shaft enters the hole.

A power transfer device includes a casing and a lubricant reservoir in the casing, the lubricant reservoir having lubricant therein. A shaft is rotatably supported within the casing and extends into the lubricant reservoir. A differential assembly is coupled to the shaft. An oil propeller wheel is fixedly mounted around the shaft for rotation therewith. The oil propeller wheel communicates with the lubrication in the lubricant reservoir and is operable to direct a portion of the lubricant from the lubricant reservoir in a direction axially along the shaft and toward the differential assembly.

According to other features, the shaft extends through a hold in the first member, the first member having a recessed portion for accommodating the oil propeller wheel. An annular space is defined between the first member and the shaft. The annular space forms a passage for delivering the lubrication from the oil propeller wheel to the differential assembly.

According to still other features, the oil propeller wheel includes a main body portion having gear type teeth disposed radially therearound. The gear type teeth extend from a first end of the main body portion to a wall portion formed at a second end of the main body portion. The gear type teeth extend in a generally helical pattern tapering outwardly and defining blade portions from the first end of the body portion to the second end of the body portion. The wall portion is operable to inhibit lubrication from flowing from the second end portion in a direction away from the first end portion. The casing defines a passage adapted to deliver the lubricant from an area adjacent the differential assembly to the lubricant reservoir.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. The differential assembly according to the present teachings may be utilized with a wide variety of applications and is not intended to be specifically limited to the particular application recited herein.

Figure 1:
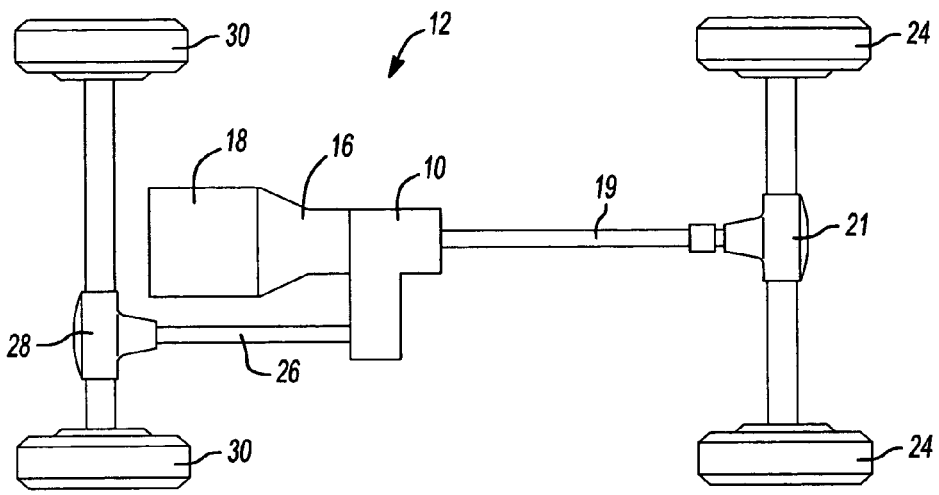
FIG. 1 is a schematic view of an exemplary motor vehicle having an exemplary transfer case into which an oil propeller shaft and oil propeller wheel constructed in accordance with the teachings of the present invention are incorporated.

With initial reference to FIG. 1, a power transfer device or transfer case 10 constructed in accordance with the teachings of the present invention is shown in conjunction with an exemplary motor vehicle 12. While the power transfer device has been shown as a transfer case 10 assembly for exemplary purposes, those of ordinary skill in the art as will readily appreciate from the following discussion, that the power transfer device may be otherwise configured. As such, the scope of the present invention is not limited by the particular example provided but rather includes devices including, but not limited to, transmissions, differentials, axles, and power-take-offs.

The vehicle 12 may include an engine 18 and a transmission 16. The transfer case 10 may be coupled to the transmission 16, which in turn operably coupled to the engine 18. A first propeller shaft 19 may be employed to transmit rotary power between the transfer case 10 and a first axle 21 for driving a first set of drive wheels 24. A second propeller shaft 26 may be employed to transmit rotary power between the transfer case 10 and a second axle 28 for driving a second set of drive wheels 30. The engine 18 produces drive torque that may be communicated to the transfer case 10 through a plurality of selectively engagable gear ratios that are provided by the transmission 16.

The transfer case 10 may receive drive torque from the transmission 16 and selectively distribute rotary power to the first and second set of drive wheels 24 and 30. In this way, the transfer case 10 may be configured to provide an "on-demand" four-wheel-drive mode, providing rear or front wheel drive as a default operation and providing power to all four wheels when necessary. Alternatively, the transfer case 10 may be configured to provide a four-wheel-drive mode controlled automatically or by a vehicle operator.

Figure 2:
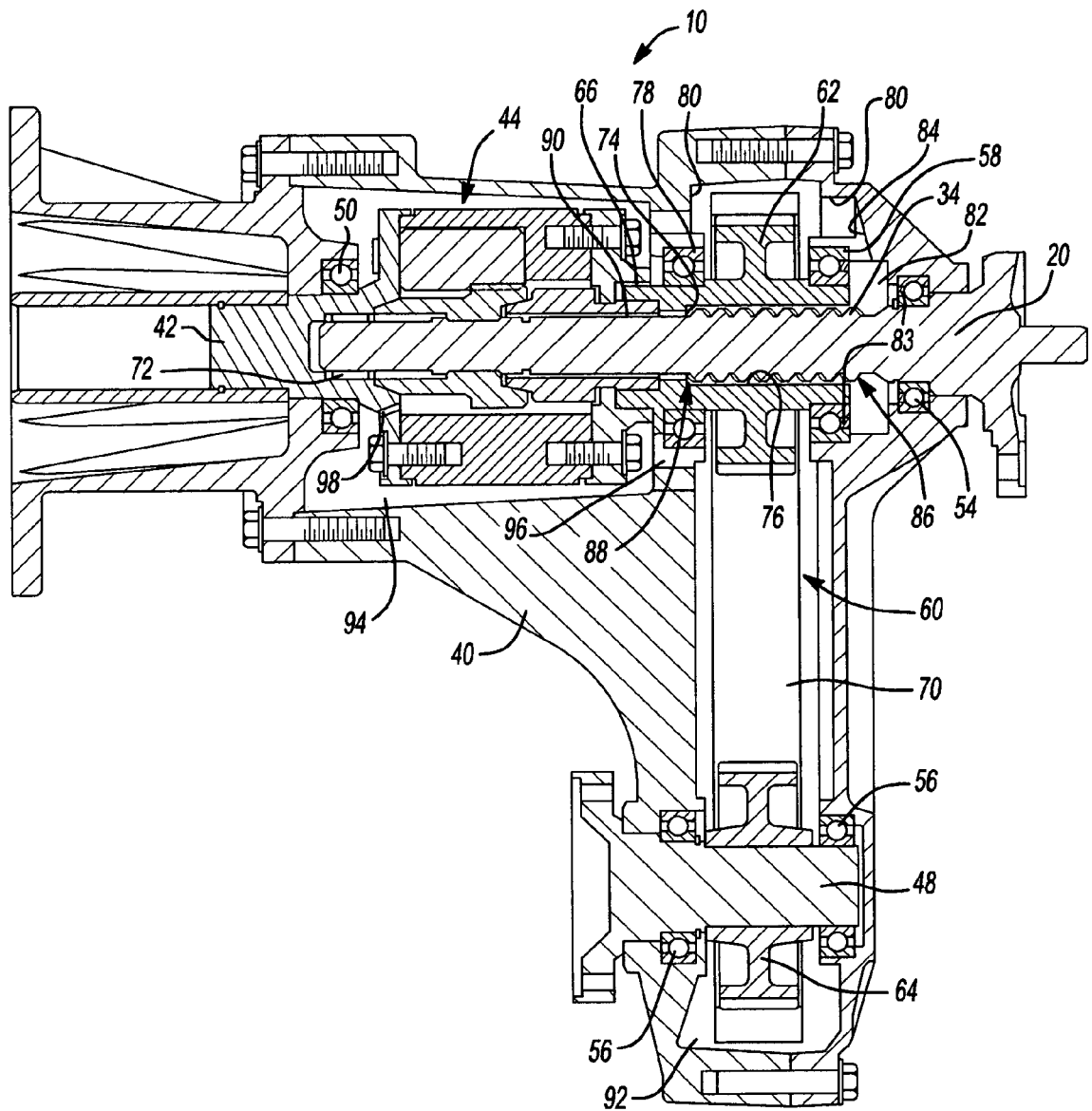
FIG. 2 is a cross-sectional view of the transfer case of FIG. 1.

With continued reference to FIG. 1 and further reference to FIGS. 2 and 3, the transfer case 10 includes a shaft, such as the first output shaft 20, that may include an intermediate threaded portion 34 for facilitating lubrication within the transfer case 10 as will be described in greater detail herein. The intermediate threaded portion 34 is formed around a circumferential surface 36 of the first output shaft 20.

The transfer case 10 may comprise a casing 40, an input shaft 42, a differential assembly 44, the first output shaft 20 and a second output shaft 48. The input shaft 42 may be drivingly connected to an output shaft (not shown) of the transmission 16 and is rotatably supported in the casing 40 by a bearing assembly 50. In the exemplary transfer case 10, the first output shaft 20 is configured to transmit rotary power for driving the first set of drive wheels 24, or rear drive wheels as depicted in FIG. 1. Likewise, the second output shaft 48 is configured to transmit rotary power for driving the second set of drive wheels 30, or front drive wheels as depicted in FIG. 1. The first output shaft 20 may be rotatably supported in the casing 40 by any appropriate means, such as a bearing assembly 54 and a needle bearing or bushing 72. The second output shaft 48 may also be rotatably supported in the casing 40 by any appropriate means, such as a pair of bearing assemblies 56.

A torque transfer mechanism 60 is disposed in the transfer case 10 for selectively transferring drive torque from the differential assembly 44 to the second output shaft 48. The torque transfer mechanism 60 generally comprises a first drive sprocket 62 rotatably mounted about the first output shaft 20, a second driven sprocket 64 rotatably mounted to the second output shaft 48 and a torque transfer element 70, such as a chain or belt, interconnecting the sprockets 62 and 64. In the examples provided, the first drive sprocket 62 has a pocket 76 that defines an annular space 74 about at least a portion of the threaded portion 34 of the first output shaft 20.

The differential casing 40 may define a wall 80 adjacent to the transfer mechanism 60 and proximate to the drive sprocket 62. The wall 80 defines a lubricant reservoir 82 that is interconnected to at least one fluid passage 84. The lubricant reservoir 82, which may be defined by the casing 40, the shield bearings 54 and 58, and the drive sprocket 62, is adapted to store a predetermined amount of lubricant, such as oil, that is used for lubricating the differential assembly 44, the needle bearing or bushing 72 and the bearing assembly 50. The lubricant reservoir 82 may be sealed at the shield bearings 54 and 58 by seals 83.

The intermediate threaded portion 34 of the first output shaft 20 extends into the lubricant reservoir 82 for communicating with the lubricant therein. More specifically, the threaded portion 34 defines an entry portion 86 on a first end, which is in communication with the lubricant reservoir 82, and a delivery portion 88 on a second end. The threaded portion 34 has a profile whereby rotation of the first output shaft 20 causes lubricant at the lubricant reservoir 82 to be directed axially along the threaded portion 34 toward the delivery portion 88 (leftward as viewed from FIG. 2). In this way, the threaded portion 34 of the first output shaft 20 urges lubrication in a direction toward the differential assembly 44. The lubrication passes through the annular space 74 and into the differential assembly 44 by way of an inlet path 90. In the example shown, the inlet path 90 is a space between the first output shaft 20 and an output of the differential assembly 44 that is coupled to the first drive sprocket 62.

As lubrication is urged into the differential assembly 44, lubrication within the differential assembly 44 is forced through the oil passages 98 and the clearance 66 between the drive sprocket 62 and the differential assembly 44. From there, the lubricant may flow into an inner cavity 94, then through an oil passage 96 and back into the inner cavity 92 of the casing 40 proximate the driven sprocket 64. The lubricant may be forced out from the differential assembly 44 through the oil passages 98 to lubricate the bearing assembly 50. The lubrication, drawing from the inner cavity 92, may be splashed onto the drive sprocket 62 and the torque transfer element 70 and thereafter may pass through the fluid passage 84 and into the lubrication reservoir 82 whereby the cycle is repeated.

Figure 3:
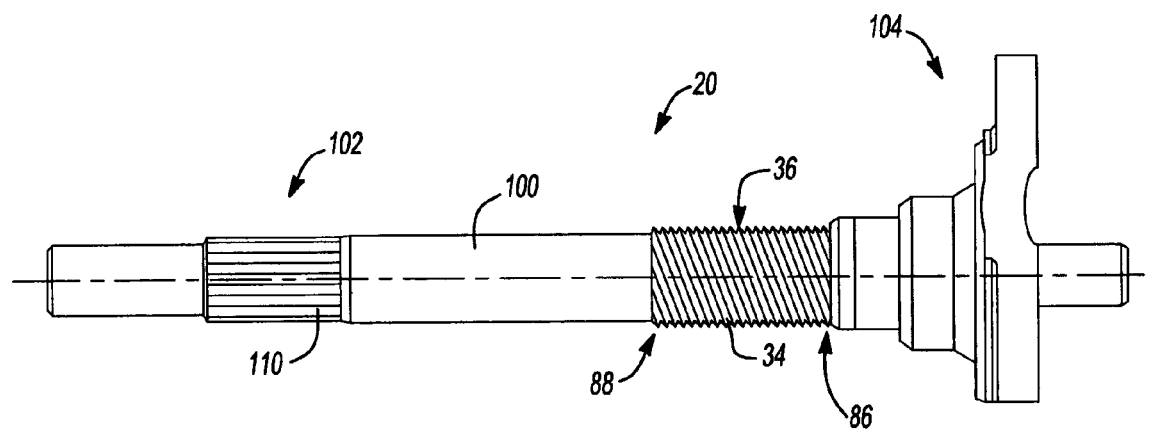
FIG. 3 is a side view of a portion of the transfer case of FIG. 1 illustrating the oil propeller shaft.

With reference to FIG. 3, the first output shaft 20 will be described in greater detail. The first output shaft 20 generally comprises a longitudinal shaft member 100 having first end portion 102, a second end portion 104 and the intermediate threaded portion 34. The first end portion 102 may include splines 110 for engaging complementary splines (not specifically shown) formed on the differential assembly 44. The second end portion 104 may have any desired configuration that permits it to transmit rotary power to the first prop shaft 19 (FIG. 1) for transmitting rotary motion to the first set of drive wheels 24 (FIG. 1).

Figure 4:
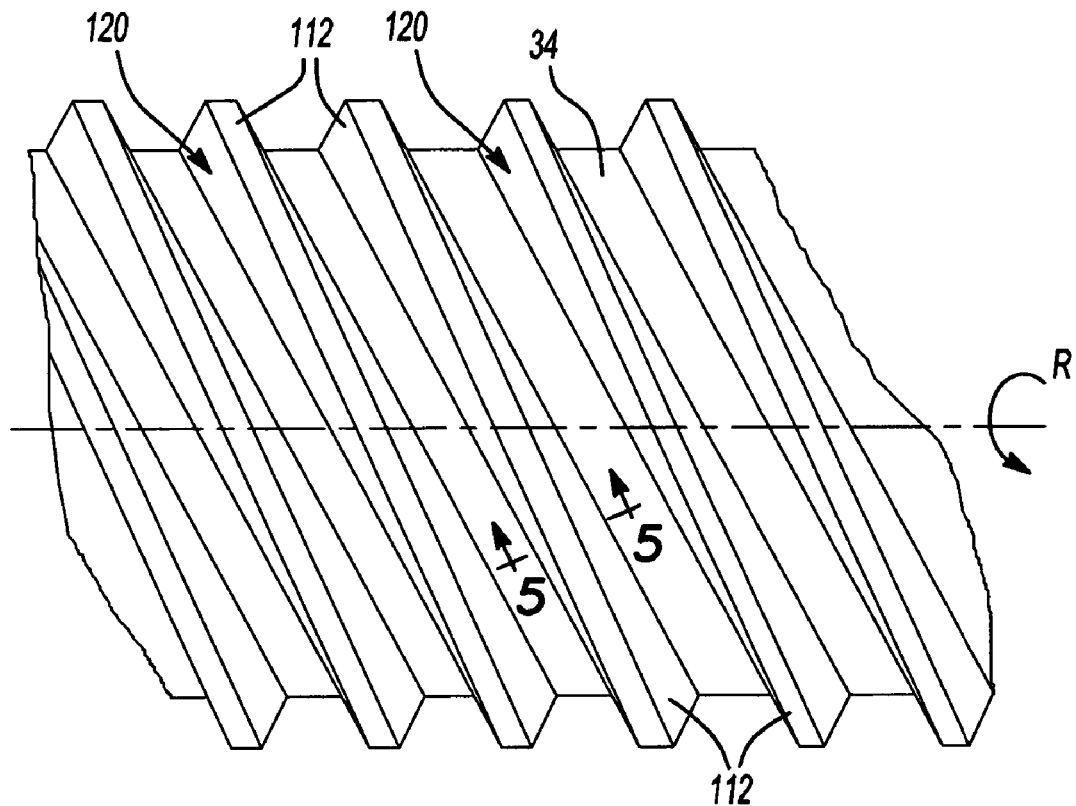
FIG. 4 is an enlarged view of the oil propeller shaft illustrating the threaded intermediate portion.
Figure 5:
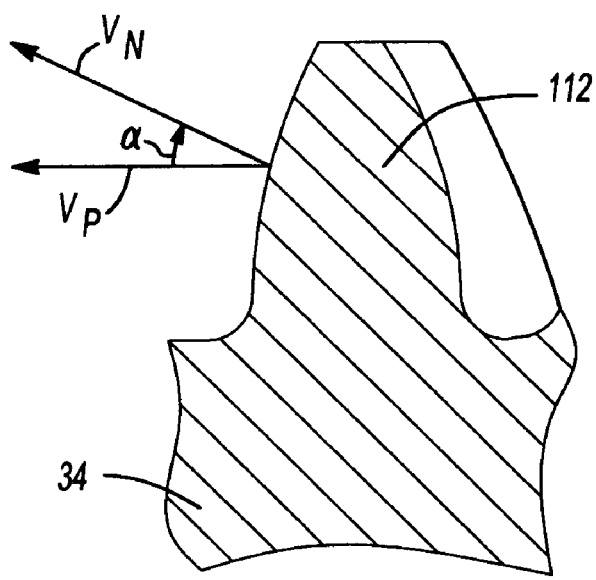
FIG. 5 is a cross-sectional view of the threaded intermediate view taken along line 5—5 of FIG. 4.

With reference to FIGS. 4 and 5, the detail of an exemplary threaded portion 34 is shown. Specifically, the threaded portion 34 is in the form of a continuous helically shaped member defining helical worm teeth 112 for communicating fluid in a desired direction (e.g., leftward as viewed in FIG. 4) to deliver lubrication to a desired location. In the example provided the first output shaft 20 rotates in the direction of arrow R. The helical worm teeth 112 each define a driving face 120 oriented on a forward side of the teeth 112. The respective driving faces 120 contact the lubrication to urge it axially along the output shaft 20 toward the differential assembly 44. The profile of the teeth 112 defines a pressure angle $\alpha$ (FIG. 5). The pressure angle $\alpha$ shown on the exemplary threaded portion 34 may comprise various angles. For example, the threaded portion 34 may comprise square teeth presenting a constant pressure angle α=0°, generally V-shaped teeth which present a constant pressure angle that is greater than 0° and less than 180°, or comprise curved teeth, such as those shown in FIGS. 4 and 5, having a variable pressure angle. In practice, the fluid delivering capacity and capability of the threaded portion 34 increases as the pressure angle decreases. The lubrication transferring efficiency is controlled by many factors such as, the number of continuous teeth 112, the length of the threaded potion 34, the pressure angle α, the tooth pitch, and surface finish of the teeth 112 for example.

Figure 6:
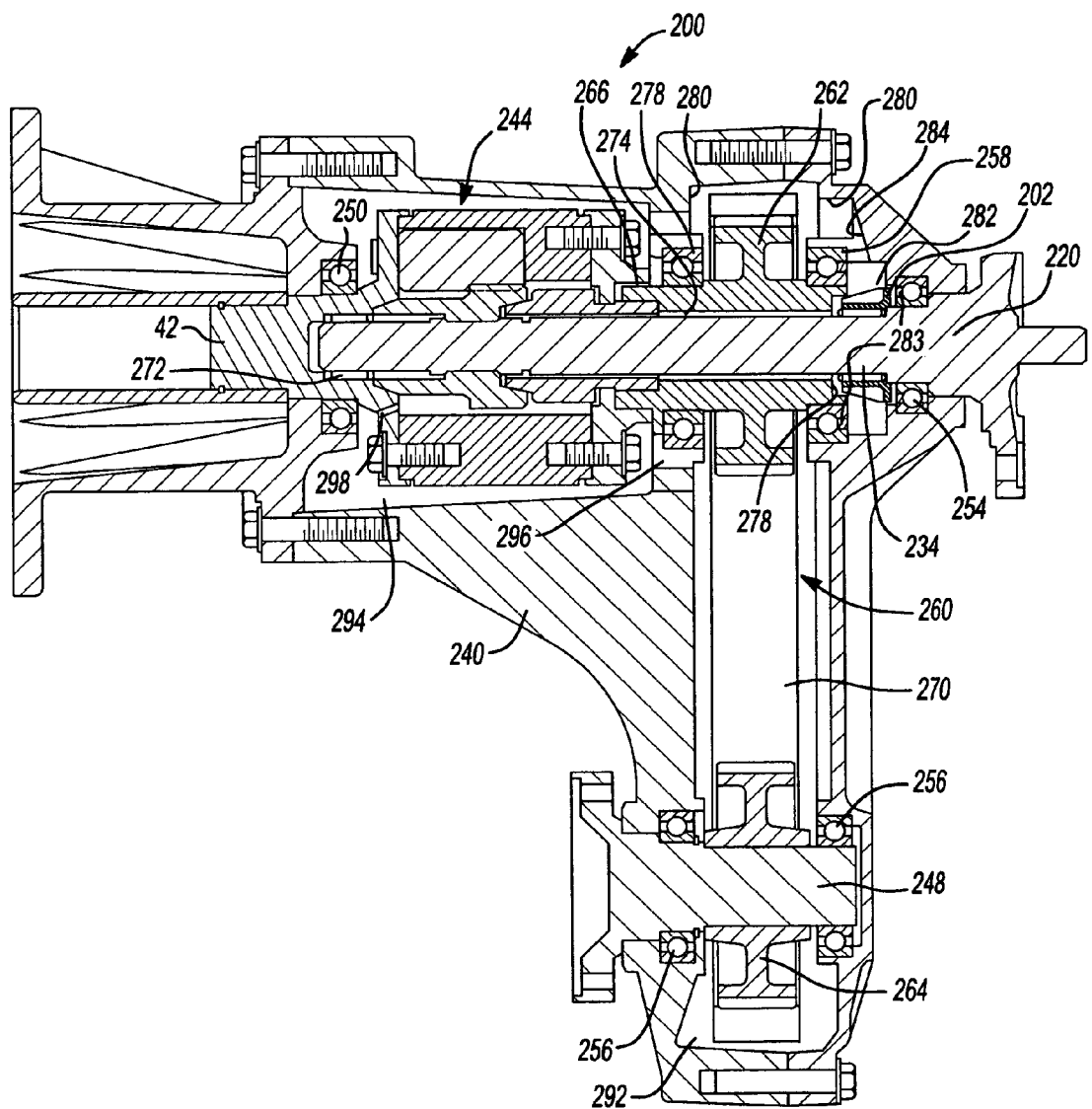
FIG. 6 is a cross-sectional view of the exemplary transfer case of FIG. 1 incorporating an oil propeller wheel constructed in accordance with the teachings of the present invention.

Turning now to FIG. 6, a second exemplary power transfer device, which may be a transfer case 200, incorporating an oil propeller wheel 202 according to other features of the present invention is shown. The transfer case 200 includes like components as described in relation to the transfer case 10 and as such, these components are designated with like reference numerals with two hundred (200) added thereto. Again, as will become readily appreciated from the following discussion, while the oil propeller wheel 202 is described in relation with a transfer case 200, the teachings of the present invention may be applied to other mechanical systems and power transfer devices for distributing lubrication to a working element.

The transfer case 200 includes an input shaft 242, a differential assembly 244, a first output shaft 220 and a second output shaft 248. A torque transfer mechanism 260 generally comprises a first drive sprocket 262 rotatably mounted about the first output shaft 220, a second driven sprocket 264 rotatably mounted to the second output shaft 248 and a torque transfer element 270 interconnecting the sprockets 262 and 264. The differential casing 240 defines a wall 280 adjacent to the transfer mechanism 270 and proximate to the drive sprocket 262. This wall 280 defines a lubricant reservoir 282 that may be interconnected to at least one fluid passage 284. The lubrication reservoir 282, which may be defined by the casing 240, shield bearings 254 and 258, and the drive sprocket 262, is adapted to store a lubricant, such as oil, used for lubricating the differential assembly 244, the needle bearing or bushing 272, and the bearing assembly 250. The lubricant reservoir 282 may be sealed at the shield bearings 254 and 258 by seals 283.

The oil propeller wheel 202 is mounted around an intermediate portion 234 of the first output shaft 220 and may be disposed in the lubricant of the lubricant reservoir 282. The oil propeller wheel 202 is securely attached to the first output shaft 220 for common rotation therewith. As will be described, the oil propeller wheel 202 is operable to direct lubrication from the lubricant reservoir 282, through an annular space 274 provided between the first output shaft 220 and the drive sprocket 262 of the transfer mechanism 270 and into the differential assembly 244. The drive sprocket 262 may include a recess 278 for accommodating the oil propeller wheel 202.

During operation, the oil propeller wheel 202 rotates with the first output shaft 220. The oil propeller wheel 202 causes lubrication to flow from the lubrication reservoir 282 in a desired direction (e.g., leftward as viewed in FIG. 6) to deliver lubrication to a desired location, such as the differential assembly 244. As lubrication is urged into the differential assembly 244, excess lubrication exits the differential assembly 244 is forced through oil passages 298 and the clearance 266 between the drive sprocket 262 and the differential assembly 244 into the inner cavity 294, then through an oil passage 296, and back into the inner cavity 292 of the casing 240 proximate the driven sprocket 264.

The lubrication may be forced out of the differential assembly 244 through the oil passages 298 to lubricate the bearing 250 assembly. The lubrication, drawing from the inner cavity, may be splashed onto the drive sprocket 262 and the torque transfer element 270 and thereafter may pass through the fluid passage 284 and into the lubrication reservoir 282 whereby the cycle is repeated.

Figure 7:
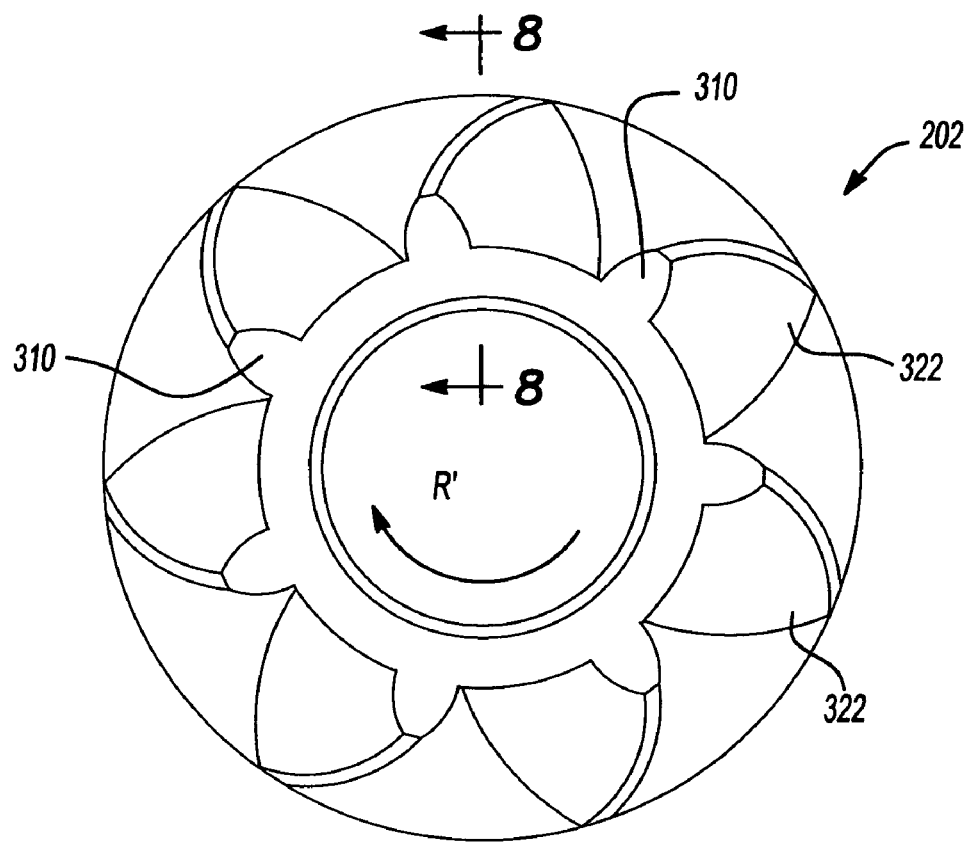
FIG. 7 is an axial end view of the oil propeller wheel of FIG. 6.
Figure 8:
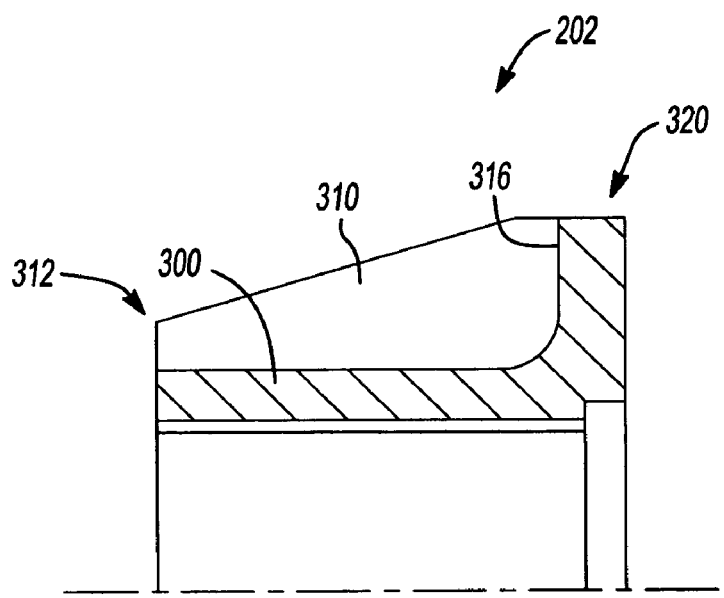
FIG. 8 is a cross-sectional view of the oil propeller wheel taken along line 8—8 of FIG. 7.

With reference to FIGS. 7 and 8, the oil propeller wheel 202 will be described in greater detail. The oil propeller wheel 202 generally includes a main body 300 having a plurality of helically-shaped circumferentially spaced-apart teeth 310 extending radially outwardly from the main body 300. The gear type teeth 310 may extend from a first axial end 312 of the body 300 to a wall portion 316 formed at a second axial end 320 of the body 300. The teeth 310 may be generally helical in shape and may taper in a radially outward direction between the ends 312 and 316 so as to define a blade portion 322 from the first end 312 of the body 300 to the second end 320 of the body 300.

The teeth 310 may be arranged in a "right-hand" helical pattern as viewed from FIG. 7. Rotation of the propeller wheel 202 in the direction of arrow R' causes the helical blade portions 322 of the teeth 310 to urge lubrication toward the differential assembly (FIG. 6). When the first output shaft 220 (FIG. 6) is rotating in a clockwise direction (for example when the vehicle is operated in reverse), the wall 316 inhibits lubrication from passing rightward beyond the body 300 and toward the bearing assembly 254 (FIG. 6). It will be appreciated from the disclosures that the "hand" of the helical lubrication moving element may be set for a desired application and as such, the scope of the present invention is not limited by the particular examples shown.

The oil propeller wheel 202 is comprised of a rigid material such as metal or plastic. It may be machined from metal such as cast iron or aluminum. Alternatively, it may be molded or cast from metal, powdered metal or plastic. The oil propeller wheel 202 may be rigidly attached to the first output gear 220 by any suitable mounting techniques, such as, but not limited to, fasteners such as a key or dowel for example, press-fit or splined with the first output shaft 220.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A power transfer device comprising:
  a casing;
  a lubricant reservoir in said casing;
  a shaft rotatably supported in said casing, the shaft extending into said lubricant reservoir;

a lubricant in said lubricant reservoir; and a lubricant driving structure coupled to said shaft for common rotation therewith, the lubricant driving structure including at least one helically shaped member that extends longitudinally along and circumferentially about at least a portion of said shaft, said at least one helically shaped member being at least partially located in said lubricant reservoir and comprising a plurality of circumferentially-spaced apart teeth that extend radially outwardly of said shaft;

wherein rotation of said at least one helically shaped member drives a portion of said lubricant in an axial direction along said shaft and away from said lubricant reservoir.

2. A power transfer device of claim 1, wherein said teeth taper radially outwardly along a direction that is generally opposite an axial direction in which the portion of the lubricant is driven.

3. A power transfer device of claim 1 wherein said at least one helically shaped member is integrally formed with the shaft.

4. A power transfer device of claim 1, wherein said shaft extends into a hole formed into another component of the power transfer device and wherein said at least one helically shaped member terminates axially along said shaft prior to a point at which said shaft enters said hole.

5. The power transfer device of claim 4, wherein a recessed area is formed into said another component about said hole.

6. The power transfer device of claim 1, wherein said shaft extends into a hole formed into another component of the power transfer device and wherein said at least one helically shaped member extends through said hole.

7. A power transfer device comprising:

a casing;

a lubricant reservoir in said casing;

a lubricant in said lubricant reservoir;

a shaft rotatably supported within said casing and extending into said lubricant reservoir;

a differential assembly coupled to said shaft;

wherein said shaft includes threads formed along an intermediate portion and defined along a circumferential surface thereof, said threads operable to direct a portion of said lubricant from said lubricant reservoir at an entry portion disposed in said fluid reservoir wherein said lubricant comes into contact with said threads in a direction axially along said shaft to a delivery portion wherein said lubricant is output toward said differential assembly; and wherein said casing defines a passage adapted to permit said lubricant to return to said lubricant reservoir from said differential assembly, wherein said passage delivers lubricant to said lubricant reservoir proximate said entry portion of said threads.

8. The power transfer device of claim 7 wherein said shaft is mounted for rotation within a structure, said structure being spaced radially apart from said threads to form a fluid passage.

9. A power transfer device comprising:

a casing;

a lubricant reservoir in said casing;

a lubricant in said lubricant reservoir;

a shaft rotatably supported within said casing and extending into said lubricant reservoir;

a differential assembly coupled to said shaft;

an oil propeller wheel fixedly mounted around said shaft for rotation therewith, said oil propeller wheel communicating with said lubricant in said lubricant reservoir and operable to direct a portion of said lubricant from said lubricant reservoir in a direction axially along said shaft and toward said differential assembly; and wherein said shaft extends through a hole in a first member, said first member having a recessed portion for accommodating said oil propeller wheel.

10. The power transfer device of claim 9 wherein an annular space is defined between said first member and said shaft, the annular space forming a passage for delivering said lubrication from said oil propeller wheel to said differential assembly.

11. The power transfer device of claim 10 wherein said oil propeller wheel includes a main body portion having gear type teeth disposed radially therearound.

12. The power transfer device of claim 11 wherein said gear type teeth extend from a first end of said main body portion to a wall portion formed at a second end of said main body portion.

13. The power transfer device of claim 12 wherein said gear type teeth extend in a generally helical pattern tapering outwardly and defining blade portions from said first end of said body portion to said second end of said body portion.

14. The power transfer device of claim 12 wherein said wall portion is operable to inhibit lubrication from flowing from said second end portion in a direction away from said first end portion.

15. A power transfer device comprising:

a casing;

a lubricant reservoir in said casing;

a lubricant in said lubricant reservoir;

a shaft rotatably supported within said casing and extending into said lubricant reservoir;

a differential assembly coupled to said shaft;

an oil propeller wheel fixedly mounted around said shaft for rotation therewith, said oil propeller wheel communicating with said lubricant in said lubricant reservoir and operable to direct a portion of said lubricant from said lubricant reservoir in a direction axially along said shaft and toward said differential assembly; and wherein said casing defines a passage adapted to deliver said lubricant from an area adjacent said differential assembly to said lubricant reservoir.

* * * * *